United States Patent [19]
Porte

[11] Patent Number: 5,303,508
[45] Date of Patent: Apr. 19, 1994

[54] ACCESS DOOR, ESPECIALLY FOR AN AIRCRAFT ENGINE COWLING, PROVIDED WITH SYNCHRONIZED PIVOTING ARTICULATED FLAP

[75] Inventor: Alain Porte, Colomiers, France

[73] Assignee: Aerospatiale Societe Nationale Industrielle, France

[21] Appl. No.: 842,079

[22] Filed: Feb. 26, 1992

[30] Foreign Application Priority Data

Mar. 12, 1991 [FR] France ................. 91 02978

[51] Int. Cl.[5] ............................................. E05F 17/00
[52] U.S. Cl. ........................................ 49/109; 49/96; 123/41.04
[58] Field of Search ............... 49/109, 110, 111, 112, 49/114, 96; 123/41.04

[56] References Cited

U.S. PATENT DOCUMENTS

| | | | |
|---|---|---|---|
| 1,826,984 | 10/1931 | Bovee | 49/111 |
| 2,069,414 | 2/1937 | Lentz et al. | 49/109 X |
| 2,289,616 | 7/1942 | Wojcik | 49/96 X |

FOREIGN PATENT DOCUMENTS

| | | |
|---|---|---|
| 0123481 | 10/1984 | European Pat. Off. . |
| 3705768 | 9/1988 | Fed. Rep. of Germany . |
| 2110343 | 6/1972 | France . |
| 67070 | 10/1913 | Switzerland ............ 49/110 |
| 741432 | 12/1955 | United Kingdom . |

*Primary Examiner*—Philip C. Kannan
*Attorney, Agent, or Firm*—Remy J. VanOphem

[57] ABSTRACT

A device for tight closure of an opening in a wall including a panel which closes the opening partially and opens to one side of the opening by pivoting about a substantially fixed axis on the other side of the opening at a substantial distance therefrom. The panel is at least approximately aligned in the direction transverse to the wall with an edge of the opening. The panel closes the opening except for a gap parallel to the axis between the edge of the opening and an inside edge of the panel which is substantially parallel to the axis. A mobile flap closes the gap. It is pivoted to the panel about a second axis extending along the inside edge of the panel. At least one link is pivoted about a substantially fixed third axis on the same side of the opening as the first axis and about a fourth axis joined to the mobile flap.

24 Claims, 4 Drawing Sheets

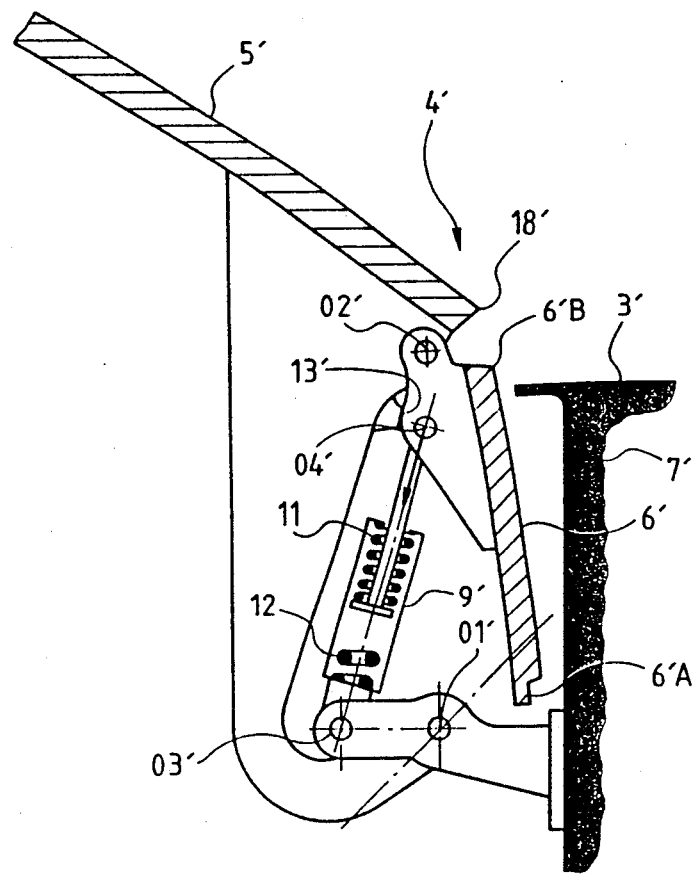
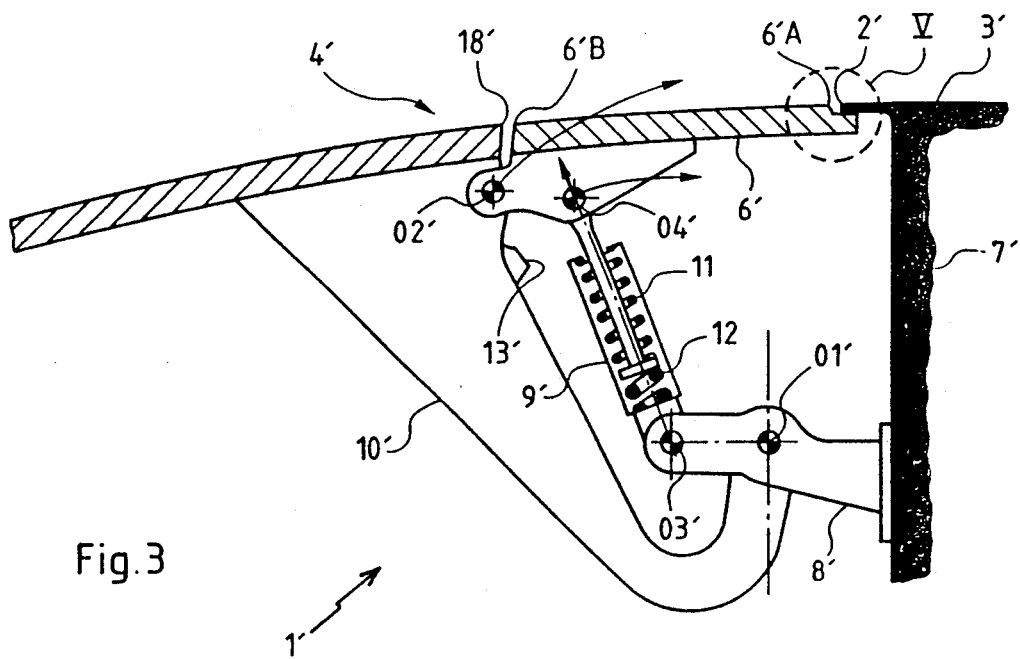

ACCESS DOOR, ESPECIALLY FOR AN AIRCRAFT ENGINE COWLING, PROVIDED WITH SYNCHRONIZED PIVOTING ARTICULATED FLAP

BACKGROUND OF THE INVENTION

The invention concerns the tight closure of an opening in a wall by an articulated door (cover, inspection panel, etc) which has to open to one side of the opening but is pivoted about an axis on the other side at a non-negligible distance from the wall.

It applies in particular, but not exclusively, to access doors in aircraft jet engine cowlings.

It is a simple matter to achieve tight closure of an opening by means of a pivoting door if the pivot axis of the door is in the immediate vicinity of the wall including the opening.

On the other hand, the same result is difficult to achieve when, for various reasons such as significant curvature of the door, for example, the pivot axis must be at a non-negligible transverse distance from the opening. In this context non-negligible distance means a distance of several times the thickness of the door.

Simple geometrical considerations show that to enable the door to move on the opposite side of the opening to the pivot axis the door necessarily stops in the closed configuration at a distance which, in the direction parallel to the pivot axis, is the closest to it. There is, therefore, a gap between the facing edges of the door and the opening. The gap is proportional to the angle through which the door opens and the distance between the articulation axis and the opening. When tight closure of the opening is required, it is necessary to provide an additional mobile flap adapted either to close the gap between the door and the edge of the opening or to clear the gap to enable the door to be opened.

The problem then arises of controlling the movement of the flap synchronously with that of the panel.

An object of the invention is to overcome this problem.

SUMMARY OF THE INVENTION

An object of the invention is to provide a device for tight closing of an opening in a wall, plane or otherwise, by means of a panel adapted to open and close on one side of the opening but pivoted about an axis on the opposite side of the opening. With the assistance of an additional mobile flap whose movement is synchronized to that of the panel, the device is accurate, simple and reliable, has a small number of separate moving parts, is easy to fit and requires no delicate adjustments, is of moderate overall dimensions, is adapted to maintain a good seal despite the possible presence of vibration and/or pressure differences between opposite sides of the panel and the flap, has good geometric stability and a low risk of becoming misaligned, and is of moderate cost.

To this end the invention proposes a device for tight closure of an opening in a wall which includes a panel adapted to close the opening partially and adapted to open to one side of the opening by pivoting about a substantially fixed axis on the other side of the opening at a substantial distance therefrom. The panel is at least approximately aligned in the direction transverse to the wall with an edge of the opening and is adapted to close the opening except for a gap extending parallel to the axis between the edge of the opening and an inside edge of the panel which is substantially parallel to the axis. A mobile flap is provided which is adapted to close the gap and which is pivoted to the panel about a second axis extending along the inside edge of the panel.

At least one link is pivoted about a substantially fixed third axis on the same side of the opening as the first axis and about a fourth axis joined to the mobile flap. In a first preferred embodiment the plane containing the third and fourth axes intersects the plane containing the first and second axes between the first and second axes.

The advantages of the invention include:
the simplicity of the kinematic system;
the simplicity of the mounting operation;
the resistance to pressure differentials between opposite sides of the opening, especially pressurization on the side of the panel pivot axis;
good resistance to vibration; and
moderate overall dimensions, there being virtually no increase in the overall dimensions due to the presence of the flap.

Other arrangements are feasible, including those in which the plane containing the first and second axes intersects the plane containing the third and fourth axes on the side of the opening to which the panel pivots, in which case the flap is stowed at least in part on this side.

According to preferred features of the invention, some of which may be combined with others, the plane containing the first and second pivot axes is at an angle of less than 90° to the plane containing the second and fourth axes. The first pivot axis is on an arm maintained at a substantially fixed distance from the wall, which arm is fixed relative to the wall.

The third pivot axis is also on the arm, and the plane containing the first and third pivot axes is substantially parallel to the flap. The panel pivots about a first axis on a coupling arm defining with the link a plane transverse to the first pivot axis. The link may have a fixed length or a length that is variable with respect to a reference length and is, for example, a cylinder, a piston rod and, in the cylinder, a disc fastened to the piston rod and acted on by at least one spring member, for example a compression spring. In an alternate embodiment, the disc is acted on in opposite directions by two compression spring members housed in the cylinder.

The aforementioned links or coupling arms can be straight or cranked to prevent them from striking other mechanical parts.

The invention also proposes an aircraft jet engine cowling in which access openings are provided with access devices of this kind.

The cowling wall preferably constitutes two openings disposed symmetrically to either side of a frame portion fastened to the wall, each opening being provided with a closure device whose respective first and third pivot axes are carried by the ends of a member adapted to slide in an opening in the frame portion.

Objects, features and advantages of the invention will emerge from the following description given by way of non-limiting example with reference to the appended drawings.

BRIEF DESCRIPTION OF THE DRAWINGS

FIG. 3 is a view in cross section of a second device in accordance with the invention in a closed configuration;

FIG. 4 is another view of the device of FIG. 3 in cross section in an open configuration;

DETAILED DESCRIPTION OF THE PREFERRED EMBODIMENT

Figure 2:
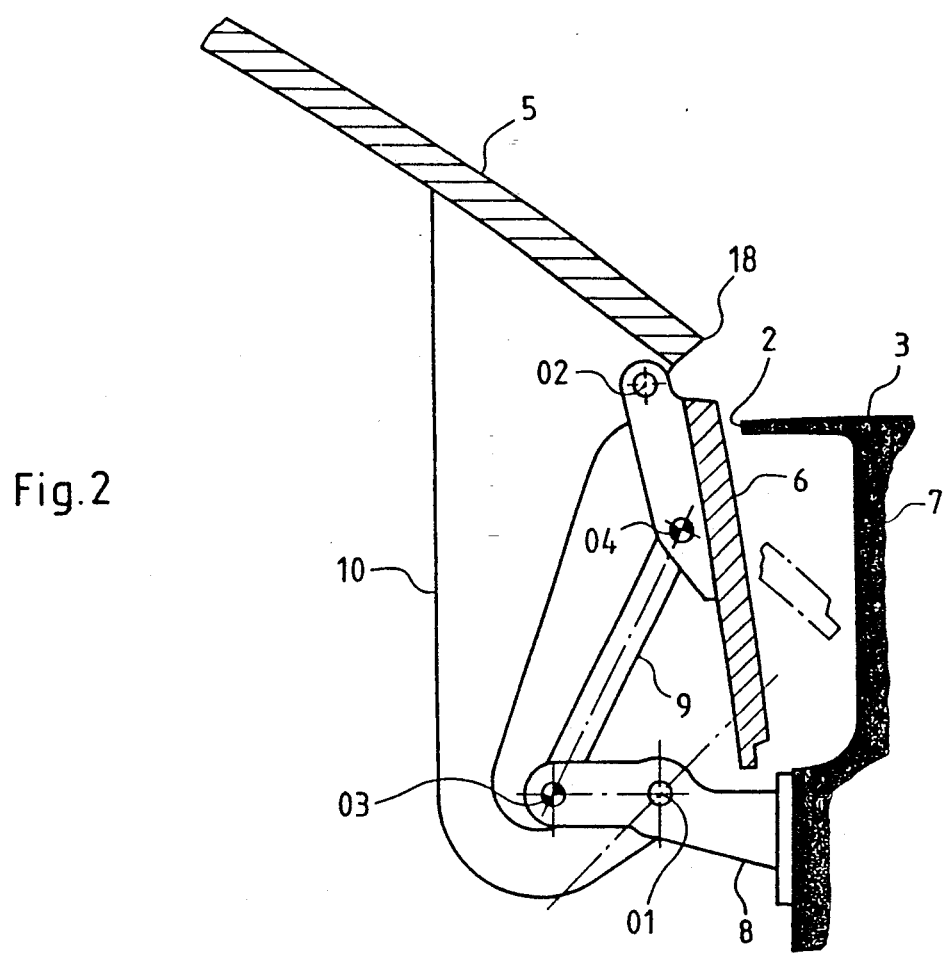
FIG. 2 is another view of the device in cross section in the open configuration.
Figure 1:
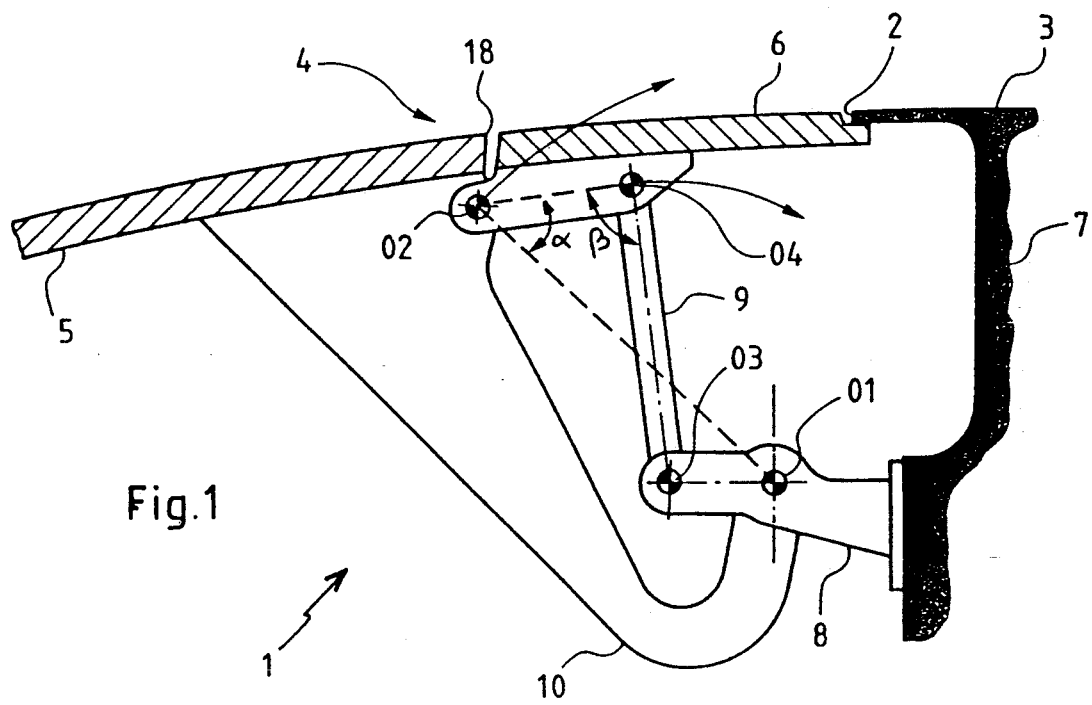
FIG. 1 is a view in cross section of a first device in accordance with the invention in a closed configuration.

FIGS. 1 and 2 show a first closure device 1 adapted for watertight closure of an opening of which only one edge 2 transverse to the plane of FIGS. 1 and 2 is shown.

The opening is formed in a wall 3 generally transverse to the plane of the figures, in this instance approximately horizontal.

In FIG. 1 the opening is closed by a hinged door 4 including a panel 5 and a mobile flap 6.

In the example under consideration, the wall 3 is part of an aircraft jet engine cowling and the door is an access door. The wall is curved with the concave side facing downwards, that is to say towards the interior of the cowling.

The wall 3 is attached to a frame 7, for example a pylon by which the cowling is suspended from an aircraft. The frame subtends an angle of approximately 90° to the wall in the vicinity of the edge of the opening near which the door is hinged.

In practice the cowling has two access doors disposed one on each side of a vertical plane through the frame. The cowling, therefore, preferably has two closure devices symmetrical to the vertical plane of which only the left-hand one is shown in FIGS. 1 and 2. The right-hand one is symmetrical to this about a vertical plane intersecting the frame 7 and extending along the right-hand edge of the figures.

Fastened to the frame 7 is an arm 8 extending some distance from the wall 3. In this example the arm 8 is substantially perpendicular to the frame 7. In actual fact a plurality of arms are disposed along the edge 2 transverse to the plane of FIGS. 1 and 2.

In an alternative embodiment (not shown) each arm 8 is part of a member which extends towards the right through the frame 7 (and therefore with the possibility of relative movement through the frame) to form on the other side a symmetrical arm having a symmetrical function in the right-hand device.

The panel 5 pivots about a first axis 01 which is at least approximately aligned with the edge 2 in the direction transverse to the wall 3, at a substantial distance therefrom.

The panel has at a distance from the edge 2 an inside edge 18 substantially parallel to the axis 01 and an outside edge (not shown) at its left-hand extremity.

The mobile flap 6 is pivoted (e.g. hinged) to the panel about a second axis 02 which runs along the edge 18 on the same side of the door as the axis 01.

The distance from the edge 18 and, therefore, from the axis 02 to the frame 7 is preferably substantially greater than the distance from the axis 01 to the frame 7. In other words, the plane containing the axes 01 and 02 is in this instance at an acute angle to the plane of the flap.

The mobile flap 6 is adapted to close the gap left by the panel 5 between the edges 18 and 2 in the closed configuration of the panel.

A link 9 (in practice there may be a plurality of them offset transversely to the plane of the figures) is pivoted about a substantially fixed axis 03 on the arm 8 in this example and about a fourth axis 04 on the mobile flap.

The axes 01, 02, 03 and 04 are substantially parallel to each other.

The plane containing the axes 03 and 04 preferably intersects the plane containing the axes 01 and 02 between the latter whereby, during the opening movement, the flap pivots synchronously with the panel, moving through a greater angle than the latter, towards the axis 01, in other words towards the interior of the cowing until it lies alongside the frame 7.

In the example shown in which a coupling arm 10 is pivoted about the axis 01 in the same plane as the link 9, the coupling arm is cranked to circumvent the end of the arm 8 at which the axis 03 is located. This favors accurate movement.

It goes without saying that the coupling arm 10 can have a more rectilinear shape if it is disposed in a plane that does not contain the link, in front of or behind the plane of FIGS. 1 and 2. In this case arms and links alternate along the axes 01 through 04, for example.

In the example shown the link 9 intersects the plane containing the axes 01 and 02 and the plane containing the axes 01 and 03 (in this example these axes are on the arm 8) is approximately parallel to the flap 6.

In an alternative embodiment (not shown) the arm 8 incorporates a rabbet facing towards the flap 6 at the top of which the axis 03 is located: the link can then be shorter, which increases the amplitude of pivoting of the flap for a given movement of the panel.

The axis 04 is in this example the same distance below the flap as the axis 02.

As mentioned above, the angle $\alpha$ between the plane containing the axes 01 and 02 and the plane containing the axes 02 and 04 is preferably acute in the chosen configuration, although this is not essential.

In the chosen configuration the angle $\beta$ between the plane containing the axes 02 and 04 and the plane containing the axes 03 and 04 is preferably not greater than 90°; in this embodiment it is approximately 90°. The smaller this angle and the greater the distance between the axes 01 and 03, the faster the flap pivots inwards. In practice this angle depends on the distance between the axes 01 and 02 and the distance between the axes 03 and 04.

In the embodiment of FIGS. 1 and 2 the link 9 is rectilinear and of fixed length.

FIGS. 3 and 4, in which components similar to those of FIGS. 1 and 2 have the same reference numbers "primed", show an embodiment suitable for more demanding applications in which the link 9' is spring-loaded and includes, for example, one or two springs having the following function. One spring 11 allows the link 9 to extend, which confers the following two advantages. The possibility of reducing the distance between the flap/panel pivot axis 02' and the link/flap pivot axis 04' which reduces the volume swept out by the flap 6' and produces an inwardly directed force only during the opening phase, thus stabilizing the flap against an abutment 13' on the panel; and a spring 12 provides an outward force urging the flap 6' against the edge 2'.

To go into more detail, in this embodiment the link is composed of a cylinder pivoting about the axis 03' and a piston rod pivoting about the axis 04'. Inside the cylinder is a housing in which slides a disc fastened to the piston rod and subject to the oppositely directed actions of the springs 11 and 12.

These functions are independent, optional and can be used separately so that a single spring can be used if required.

Seals are advantageously provided at the extremities 6'A and 6'B of the flap and likewise around the entire perimeter of the panel.

Figure 6:
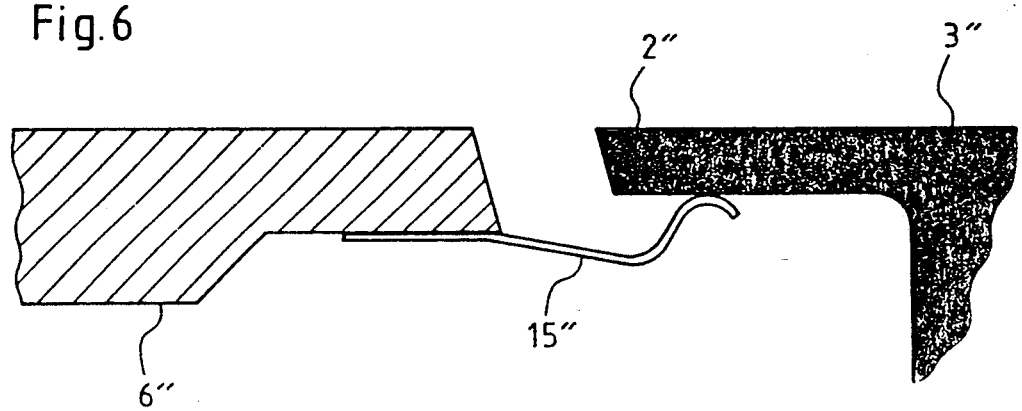
FIG. 6 is a view analogous to FIG. 5 showing an alternative embodiment of the sealing means between the flap and the edge of the opening to be closed.
Figure 5:
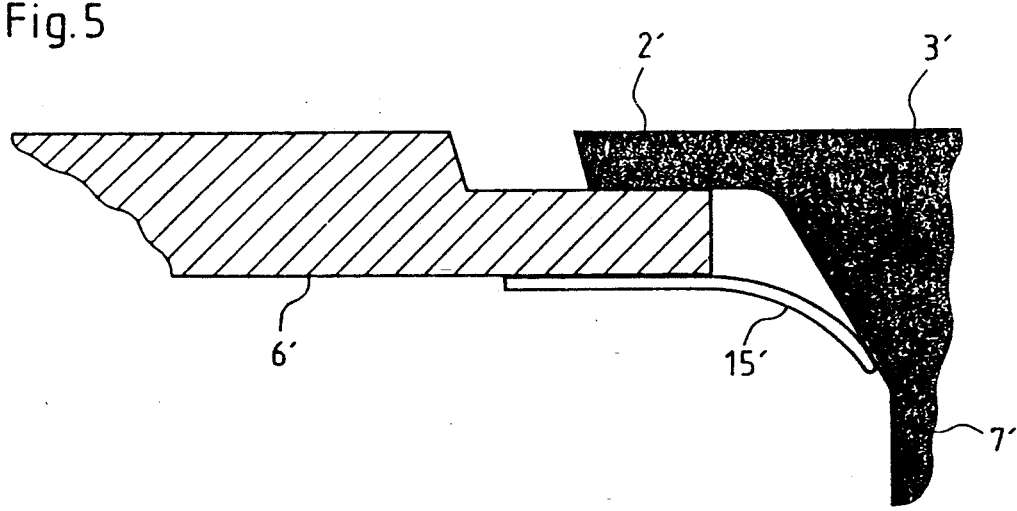
FIG. 5 is a view of the detail marked V in FIG. 3.

Two principal techniques with regard to the extremity 6'A are shown in FIGS. 5 and 6.

Use of a mechanical abutment against the edge 2' and a separate seal 15' is depicted in FIG. 5:

a) in the "closed" position a rabbet in the edge of the flap 6' (or any member attached to the flap) abuts against the fixed part to provide flap/fixed part alignment; the spring 12 guarantees this alignment despite positional tolerances or relative movement between the flap and the fixed part; and b) the seal is provided by a flexible seal 15' with no mechanical function, for example a metal seal 15'', which is sufficiently stiff to withstand the force of the spring extending the spring-loaded link while still providing the seal. See FIG. 6 in which parts similar to those in FIG. 5 are identified by the same reference number "double-primed".

Figure 7:
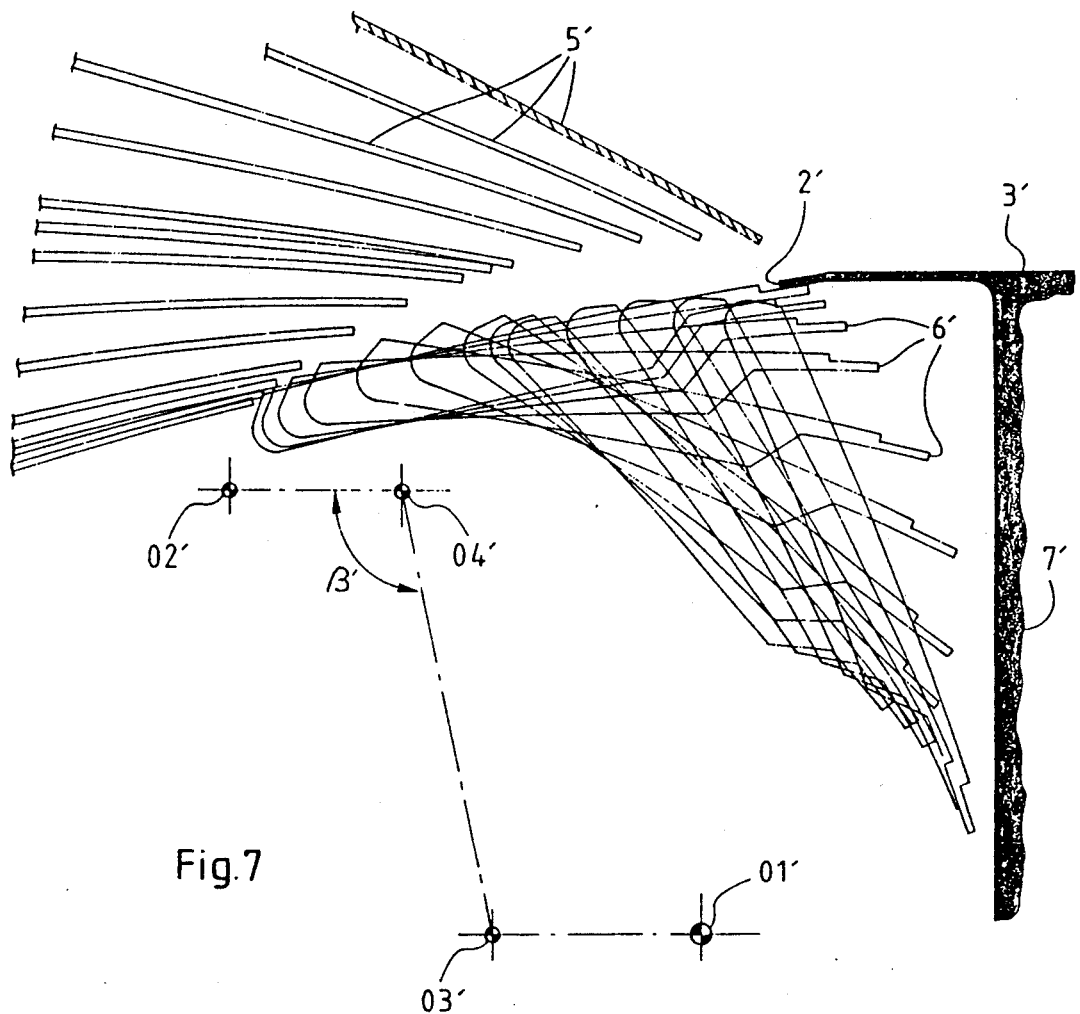
FIG. 7 is an overall dimension drawing showing the volume swept out by the door (panel and flap) when it is opened.

FIG. 7 shows that the volume swept out by the flap is entirely contained between the arm 8 and the plane of the opening.

To summarize, the invention has the following advantages in all cases.

Simple design requiring few component parts;

the flap is pivoted by means of a conventional set of hinges or yokes, which has the advantages of using a simple and proven, stable and vibration-resistant technology; and the flap opening towards the interior of the door offers the advantages of taking up no additional space as compared to that taken up by the door in the open position; if there is a pressure differential between the inside and the outside of the flap it tends to close the flap and to increase the effectiveness of the seals.

If the link is spring-loaded, after the positional adjustments and calibration of the force exerted by the spring-loaded link have been set up on an adjustment jig no further adjustment is required on mounting the assembly (panel, flap, links) on the fixed part; and the effects of tolerances and relative movement between the door and the wall or the frame have little harmful influence on operation and are compensated by the elasticity of the spring-loaded link 9'.

It goes without saying that the foregoing description has been given by way of non-limiting example only and that numerous variants may be put forward by one skilled in the art without departing from the scope of the invention. In particular, the invention may be applied to other types of access panels, for example panels on ships or aircraft which must not protrude from the wall including the opening to be closed.

Other configurations are feasible for the axes 01 through 04, in particular with an angle $\beta$ greater than 90° and any value of the angle $\alpha$, in which case the flap 6 can be stowed partially on the outside: to give one example, with $\alpha + \beta = 180°$ (planes 01-02 and 03-04 parallel) and with cranked links 9 the flap can lie alongside the wall on the exterior of the cowling.

Opening can be manual or actuated by any appropriate known automatic mechanism.

In practice the openings to be closed are usually of generally rectangular shape, possibly with rounded corners, with at least one straight edge adapted to constitute the reference edge 2 or 2' shown in FIGS. 1 through 4.

What is claimed is:

1. A device for tight closure of an opening in a wall supported by a frame such that said opening defines an edge of said wall, said device comprising:

first means for closing a portion of said opening, said first means being pivotably attached to said frame along one side of said opening by pivoting about a substantially fixed first axis, said first means having a closure edge such that said closure edge of said first means forms a gap with said edge of said wall when said first means is in a closed position;

second means pivotably attached to said first means for closing said gap, said second means being pivotable about a second axis at said closure edge of said first means for closing; and at least one link pivotably attached to said second means at a fourth axis and pivotably attached about a substantially fixed third axis along said one side of said opening.

2. A device according to claim 1 wherein a plane defined by said third and fourth axes intersects a plane defined by said first and second axes between said first and second axes.

3. A device according to claim 1 wherein a plane defined by said first and second axes defines an angle of less than 90° to a plane defined by said second and fourth axes.

4. A device according to claim 1 wherein said first means further comprises an arm attached to said frame at a location spaced from said opening in said wall, and wherein said fixed first axis is located on said arm at a substantially fixed distance from said frame.

5. A device according to claim 4 wherein said arm is located at a fixed position relative to said wall.

6. A device according to claim 4 wherein said third axis is located at said arm.

7. A device according to claim 1 wherein a plane defined by said fixed first and said fixed third axes is substantially parallel to said wall.

8. A device according to claim 1 wherein said first means further comprises a panel for closing a portion of said opening, a coupling arm pivotable about said fixed first axis, said coupling arm having one end attached to said panel and an opposite end pivotably attached about said first fixed axis.

9. A device according to claim 1 wherein said at least one link has a predetermined length.

10. A device according to claim 1 wherein said at least one link has a variable length.

11. A device according to claim 10 wherein said at least one link comprises:

a cylinder attached at one of said third and fourth axes;

a piston rod attached at another one of said third and fourth axes;

a piston disposed within said cylinder and attached to said piston rod; and means biased against said piston for effecting said variable length of said at least one link.

12. A device according to claim 1 wherein a plane defined by a line drawn through said fixed first and fixed third axes is approximately parallel to a plane defined by a line drawn through said second and fourth axes when said first means is in said closed position.

13. An aircraft engine cowling comprising a wall in which an opening defining an edge of said wall is formed, said opening being provided with a closure device for tight closure of said opening in said wall, said closure device comprising:

first means for closing a portion of said opening, said first means being pivotable at one side of said opening by pivoting about a substantially fixed first axis, said first means having a closure edge such that said closure edge of said first means forms a gap with said edge of said wall when said first means is in a closed position;

second means pivotably attached to said first means for closing said gap, said second means being pivotable about a second axis at said closure edge of said first means; and at least one link pivotably attached to said second means at a fourth axis and pivotably attached about a substantially fixed third axis along said one side of said opening.

14. An aircraft engine cowling according to claim 13 wherein a plane defined by said third and fourth axes intersects a plane defined by said first and second axes between said first and second axes.

15. An aircraft engine cowling according to claim 13 wherein a plane defined by said first and second axes defines an angle of less than 90° to a plane defined by said second and fourth axes.

16. An aircraft engine cowling according to claim 13 wherein a plane defined by said first and third axes is substantially parallel to said wall.

17. An aircraft engine cowling according to claim 13 further comprising a coupling arm pivotable about said first axis, said first means being attached to said coupling arm.

18. An aircraft engine cowling according to claim 13 wherein said at least one link has a predetermined length.

19. An aircraft engine cowling according to claim 13 wherein a plane defined by said first and third axes is approximately parallel to a plane defined by said second and fourth axes when said first means is in said closed position.

20. An aircraft engine cowling according to claim 13 further comprising an arm disposed along said one side of said opening within said aircraft engine cowling, wherein said first axis is located at said arm.

21. An aircraft engine cowling according to claim 20 wherein said arm is located at a fixed position relative to said wall.

22. An aircraft engine cowling according to claim 20 wherein said third axis is located at said arm.

23. An aircraft engine cowling according to claim 13 wherein said at least one link has a variable length.

24. An aircraft engine cowling according to claim 23 wherein said at least one link comprises:

a cylinder attached at one of said third and fourth axes;

a piston rod attached at another one of said third and fourth axes;

a piston disposed within said cylinder and attached to said piston rod; and means biased against said piston for effecting said variable length of said at least one link.

* * * * *

UNITED STATES PATENT AND TRADEMARK OFFICE
CERTIFICATE OF CORRECTION

PATENT NO. : 5,303,508
DATED : April 19, 1994
INVENTOR(S) : Alain Porte

It is certified that error appears in the above-indentified patent and that said Letters Patent is hereby corrected as shown below:

Column 4, line 18, delete "cowing" insert ---- cowling ----.

Signed and Sealed this

Sixteenth Day of August, 1994

Attest:

BRUCE LEHMAN

Attesting Officer

Commissioner of Patents and Trademarks